United States Patent
Yanagisawa

(10) Patent No.: US 9,097,920 B2
(45) Date of Patent: *Aug. 4, 2015

(54) DISPLAY DEVICE

(71) Applicants: Japan Display Inc., Tokyo (JP); Panasonic Liquid Crystal Display Co., Ltd., Hyogo-ken (JP)

(72) Inventor: Syou Yanagisawa, Mobara (JP)

(73) Assignees: JAPAN DISPLAY INC., Tokyo (JP); PANASONIC LIQUID CRYSTAL DISPLAY CO., LTD., Hyogo-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,935

(22) Filed: Jan. 7, 2014

(65) Prior Publication Data

US 2014/0117355 A1 May 1, 2014

Related U.S. Application Data

(63) Continuation of application No. 12/816,544, filed on Jun. 16, 2010, now Pat. No. 8,629,965.

(30) Foreign Application Priority Data

Jun. 17, 2009 (JP) ................................. 2009-144604
Jun. 17, 2009 (JP) ................................. 2009-144607

(51) Int. Cl.
  *G02F 1/1345* (2006.01)
  *G02F 1/13* (2006.01)

(52) U.S. Cl.
  CPC ............ *G02F 1/1309* (2013.01); *G02F 1/1345* (2013.01); *G02F 1/13458* (2013.01)

(58) Field of Classification Search
  CPC ........................... G02F 1/1345; G02F 1/13452
  USPC .................................................. 349/149–152
  See application file for complete search history.

(56) References Cited

U.S. PATENT DOCUMENTS

| 7,924,390 | B2 | 4/2011 | Yanagisawa et al. |
| 7,965,368 | B2 | 6/2011 | Takahashi |
| 8,629,965 | B2 * | 1/2014 | Yanagisawa .................. 349/152 |
| 2007/0216822 | A1 | 9/2007 | Ishige et al. |
| 2008/0001885 | A1 | 1/2008 | Yanagisawa et al. |
| 2008/0049171 | A1 | 2/2008 | Takahashi |

\* cited by examiner

FOREIGN PATENT DOCUMENTS

| JP | 2004-053702 | 2/2004 |
| JP | 2008-009246 | 1/2008 |
| JP | 2008-020791 | 1/2008 |

*Primary Examiner* — Dung Nguyen
(74) *Attorney, Agent, or Firm* — Lowe Hauptman & Ham, LLP

(57) ABSTRACT

A display device includes a substrate having a display region with signal lines within the display region connected to respective terminals in a terminal group outside the display region via terminal wires, and an IC driver having bumps facing and connected to the terminals via an isotropic conductive film. The terminal wires have first, second, third and fourth terminal wires, and the terminals have a first terminal connected to the first terminal wire, a second terminal connected to the second terminal wire, a third terminal connected to the third terminal wire, and a fourth terminal connected to the fourth terminal wire. The first terminal and the second terminal are staggered with respect to each other, the second terminal and the third terminal are staggered with respect to each other, and the third terminal and the fourth terminal are staggered with respect to each other.

8 Claims, 18 Drawing Sheets

DISPLAY DEVICE

CROSS-REFERENCE TO RELATED APPLICATION

The present invention is a continuation application of U.S. application Ser. No. 12/816,544, filed Jun. 16, 2010, the contents of which are incorporated herein by reference.

The present application claims priority over Japanese Applications JP2009-144607 filed on Jun. 17, 2009 and JP2009-144604 filed on Jun. 17, 2009, the contents of which are hereby incorporated into this application by reference.

BACKGROUND OF THE INVENTION (1) Field of the Invention

The present invention relates to a display device, and in particular, to a technology for connecting IC drivers to wires of which the pitch has become smaller as the display devices are miniaturized, the definition of the screens increases, and the IC drivers are miniaturized.

(2) Description of the Related Art

Liquid crystal display devices are formed such that pixel electrodes and thin film transistors (TFT's) are formed in a matrix on a TFT substrate to which a facing substrate, where color filters are formed in locations corresponding to the pixel electrodes, is attached so that liquid crystal is sandwiched between the TFT substrate and the facing substrate. Thus, the transmittance of light is controlled for each pixel by the liquid crystal molecules so that an image is formed.

A number of video signal lines running in the longitudinal direction and aligned in the lateral direction and a number of scan signal lines running in the lateral direction and aligned in the longitudinal direction are formed on a TFT substrate, and pixels are formed in the regions surrounded by the video signal lines and the scan signal lines. Each pixel is mainly formed of a pixel electrode and a thin film transistor (TFT, which is a switching element). Thus, a great number of pixels formed in a matrix form a display region. TFT's are formed in the display region on the TFT substrate, and an inorganic passivation film is formed on top and pixel electrodes are formed on top on this. An insulating film, such as of SiN, is formed as the inorganic passivation film, and a transparent conductive film, such as of ITO (indium tin oxide), is used for the pixel electrodes.

A terminal group for supplying signals (video signals) to video signal lines and a terminal group for supplying signals (scan signals) to scan signal lines are formed around the outside of the display region on the TFT substrate. In addition, IC drivers (driver chips) bumps are connected to these terminal groups. Here, as the definition of the screen increases, the number of terminals connected to the IC drivers increases and the pitch between terminals decreases. In addition, decrease in the pitch between bumps as the IC drivers are miniaturized also becomes a factor that makes the pitch between terminals decrease. Thus, the area through which bumps formed on the IC drives and terminals are connected cannot be secured sufficiently. JP2008-020791A describes the configuration where the pitch between wires is smaller than the pitch between the bumps on the IC drivers, and the wires and the bumps are connected in several staggered places so that the pitch between the bumps and the pitch between the wires match.

In the case where the display device is miniaturized and the frame around the display region becomes smaller, a structure where lead lines for scan signal lines, in particular, are collected along one side of the display device is adopted. In this case, a large area is required for all of the above described lead lines to be wired on one surface. In order to avoid this, the above described lead lines are wired three-dimensionally (in multiple layers) via insulating films in between so that the area for wiring can be reduced. Such a structure is described in JP2004-53702A, for example.

In addition, wires formed in display devices are inspected to see whether or not there is a short circuit at a stage before mounting IC drivers during the manufacturing process for a display device. In the case where a defect, such as short-circuiting of a wire, is discovered at this stage, it is not necessary to carry out the subsequent steps on the defective display device, and thus, the cost for manufacture can be reduced. In this case, the TFT switches driven at the time of inspection are formed in the region where IC drivers are to be mounted, that is to say, in the region that is to be hidden by the IC drivers mounted afterwards. JP2008-9246A describes a structure of a display device that makes this inspection step possible.

SUMMARY OF THE INVENTION

As the definition of the display devices further increases and reduction in the width of the frame and miniaturization of IC drivers further progress, the pitch between wires is further decreased. In liquid crystal display devices, wires are covered with an insulating film, for example, a passivation film, so that the wires are protected from the open air. However, it is necessary to create contact holes in this insulating film in places to which bumps of IC drivers are connected so that the wires are exposed. In addition, these contact hole portions are covered with a chemically stable transparent conductive film, such as of ITO, so that the wires do not become corroded in the contact hole portions.

A predetermined area is necessary to create a contact hole. In addition, a predetermined contact area is necessary in order to secure the reliability in the connection between terminals and bumps. In order to secure a contact hole area or in order to secure an area for contact between terminals and bumps, terminals may be staggered or zigzag as in JP2008-020791A. In the case where this configuration is adopted, however, the areas for other wires that run in parallel may be narrowed. Thus, in some cases, the width of the wires and the intervals between wires are smaller than those made possible by precision in the process for wires.

An object of the present invention is to provide a display device where the area for terminals for the connection to IC drivers and a predetermined area for contact holes for terminals can be secured, thus making patterning of the wires possible even in the case where the pitch between wires becomes small as a result of an increase in the definition.

Another object of the present invention is to provide a display device where the margin for inaccuracy in the mounting of IC drivers can be increased in order to prevent short-circuiting.

The structure according to the present invention can be made as follows, for example.

(1) The present invention provides a display device having:

a substrate having a display region so that signal lines formed within the above described display region are connected to respective terminals in a terminal group formed outside the above described display region via terminal wires; and an IC driver having bumps respectively facing and being connected to the above described terminals via an isotropic conductive film, and being characterized in that the above described terminals are arranged in multiple staggered places in the direction in which the above described terminal wires run, in the case where one of the adjacent terminals, which are located at the same position, is a first terminal and the other is a second terminal, the regions where the above described first terminal and the above described second terminal are formed have a first portion of a terminal wire that is wider than the other portion and a second portion of the terminal wire which is adjacent to the above described first portion in the direction in which the above described terminal wire runs, and the first portion and the second portion in the region where the above described first terminal is formed and the first portion and the second portion in the region where the above described second terminal is formed are staggered, the above described first terminal and the above described second terminal are formed of a transparent conductive film made of a wide portion for covering the contact hole created above the first portion of the terminal wire and a narrow portion provided so as to overlap the second portion of the terminal wire from above, the other terminal wire adjacent to the above described first portion is formed so as to be bent in order to avoid interference with the above described first portion, and the bump of the above described IC driver connected to the above described first terminal has a wide portion corresponding to the wide portion of the above described first terminal and a narrow portion corresponding to the narrow portion of the above described first terminal, and the bump of the above described IC driver connected to the above described second terminal has a wide portion corresponding to the wide portion of the above described second terminal and a narrow portion corresponding to the narrow portion of the above described second terminal.

(2) The display device according to the present invention is a display device, wherein signal lines running within a display region are connected to terminals formed outside the above described display region via terminal wires, and the above described terminals include first terminals and second terminals which are staggered in the direction in which the terminal wires run, and is characterized in that the first terminal wires having the above described first terminals comprise a first SD metal running from the above described display region side, a first gate metal and a first transparent conductive film so that the above described first transparent conductive film covers a first contact hole created in a wide portion of the above described first SD metal and a second contact hole created in a wide portion of the above described first gate metal and is connected to the above described first SD metal and the above described first gate metal so as to form a first crossover portion, the above described first terminals are formed by making the above described first transparent conductive film run so as to have a width narrower than the width of the regions where the above described first contact hole and the above described second contact hole are created, the second terminal wires having the above described second terminals comprise a second gate metal running from the above described display region side, a second SD metal and a second transparent conductive film so that the above described second transparent conductive film covers a third contact hole created in a wide portion of the above described second gate metal and a fourth contact hole created in a wide portion of the above described second SD metal and is connected to the above described second gate metal and the above described second SD metal so as to form a second crossover portion, the above described second terminals are formed by making the above described second transparent conductive film run so as to have a width narrower than the width of the regions where the above described third contact hole and fourth contact hole are created, the above described first crossover portions in adjacent first terminal wires are staggered in the direction in which the above described first terminal wires run, and second terminal wires adjacent to the above described first crossover portion are formed so as to be bent in order to avoid interference with the above described first crossover portions, and the above described second crossover portions in adjacent second terminal wires are staggered in the direction in which the above described second terminal wires run, and first terminal wires adjacent to the above described second crossover portion are formed so as to be bent in order to avoid interference with the above described second crossover portions.

(3) The display device according to the present invention is a display device, wherein a number of signal lines running within a display region respectively lead out to terminals in a terminal group formed outside the above described display region via terminal wires, and at the same time, connected to thin film transistors for inspection which are operable to be connected to wires for inspection, and the above described terminals include at least first terminals and second terminals which are provided so that adjacent terminals are staggered in the direction in which terminal wires run, and is characterized in that first terminal wires having the above described first terminals are formed where a gate metal running from the above described display region side is switched to an SD metal, the switching portion being made of a transparent conductive film for covering both a first contact hole created in a wide portion of the above described gate metal adjacent to the above described SD metal and a second contact hole created in a wide portion of the above described SD metal adjacent to the above described gate metal, the above described first terminals are formed of the above described transparent conductive film overlapping the above described first terminal wire outside the region where the above described first contact hole and the above described second contact hole are created so as to run with a width narrower than that of the region where the above described first contact hole and the above described second contact hole are created, the second terminal wires having the above described second terminals are formed of an SD metal running from the above described display region side, the above described second terminals are formed of a transparent conductive film connected through a third contact hole created in a wide portion of the above described SD metal overlapping the above described SD metal in a region where the above described third contact hole is created so as to extend with a width narrower than that of the region where the above described contact hole is created, the above described switching portions of the above described first terminal wires are provided so as to be staggered in the direction in which the above described first terminal wires run, and the second terminal wires adjacent to the above described switching portions are formed so as to be bent in order to avoid interference with the above described switching portions, and regions of the above described second terminal wires where the above described third contact holes are created are provided so as to be staggered in the direction in which the above described second terminal wires run, and the first terminal portions adjacent to the regions where the above described third contact holes are created are formed so as to be bent in order to avoid interference with the regions where the above described third contact holes are created.

(4) The display device according to the present invention is a display device, wherein a number of signal lines running within a display region lead out to terminals in a terminal group formed outside the above described display region via terminal wires, the above described terminals include at least first terminals and second terminals which are provided so as to be staggered in the direction in which terminal wires run, and the above described terminal wires are formed of a metal in the same layer, and is characterized in that first terminal wires having the above described first terminals have a wide portion, and the above described first terminals are formed of a transparent conductive film connected through a first contact hole created in the above described wide portion of the above described first terminal wires overlapping the above described terminal wire outside the region where the above described first contact hole is created so as to run towards the above described second terminals side with a width narrower than that of the region where the above described first contact hole is created, second terminal wires having the above described second terminals have a wide portion, and the above described second terminals are formed of a transparent conductive film connected through a second contact hole created in the above described wide portion of the above described second terminal wires overlapping the above described terminal wire outside the region where the above described second contact hole is created so as to run towards the above described first terminals side with a width narrower than that of the region where the above described second contact hole is created, the regions of the above described first terminal wires in which the above described first contact holes are created are provided so as to be staggered in the direction in which the above described first terminal wires run, and the second terminal wires adjacent to the regions in which the above described first contact holes are created are formed so as to be bent in order to avoid interference with the region in which the above described first contact holes are created, and the regions of the above described second terminal wires in which the above described second contact holes are created are provided so as to be staggered in the direction in which the above described second terminal wires run, and the first terminal wires adjacent to the regions in which the above described second contact holes are created are formed so as to be bent in order to avoid interference with the region in which the above described second contact holes are created.

Here, the above described structures are merely examples and various modifications are possible for the present invention as long as the technological ideas are not deviated from. In addition, examples of the structures according to the present invention other than the above described structures will be clarified from the descriptions throughout the present specification and the drawings.

In the display device according to the present invention, the area of the terminals for the connection to IC drivers and a predetermined area in the terminals for contact holes can be secured, thus making patterning of the wires possible even in the case where the pitch between wires is small as a result of an increase in the definition.

In addition, in the display device according to the present invention, the margin for inaccuracy in the mounting of IC drivers can be increased in order to prevent short-circuiting.

Other effects of the present invention will be clarified throughout the description of the specification.

DESCRIPTION OF THE PREFERRED EMBODIMENTS

Figure 1:
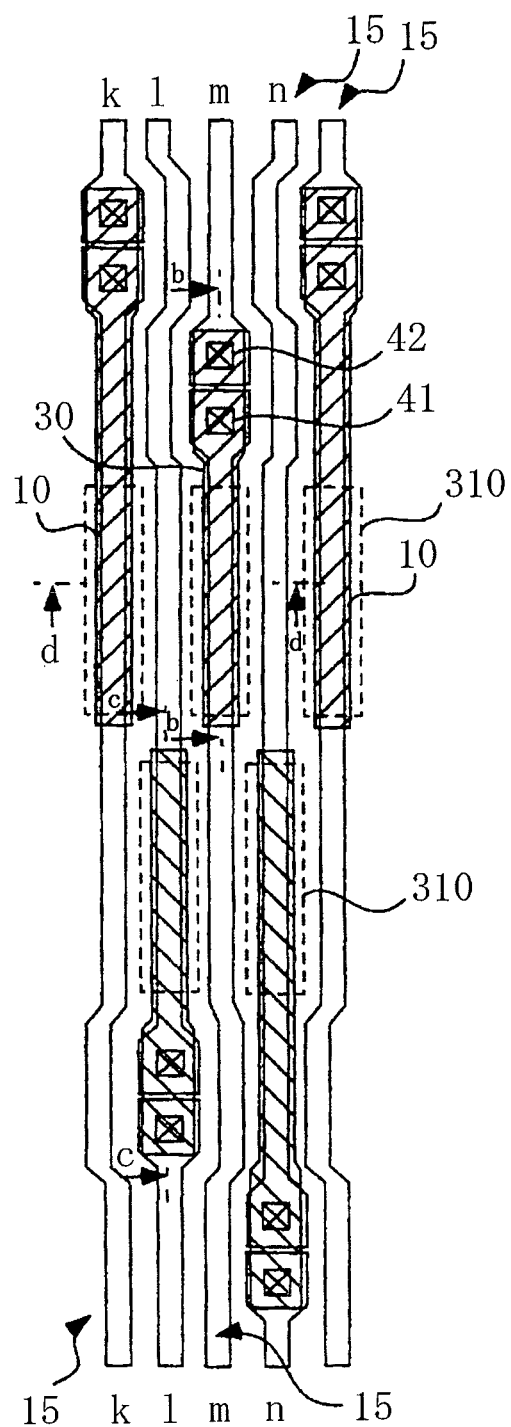
FIG. 1 is a plan diagram showing the display device according to the second embodiment of the present invention.

The embodiments of the present invention are described below in reference to the drawings. Here, the same symbols are attached to the same or similar components in the drawings and in the embodiments, and the same descriptions are not repeated.

Here, prior to the description of a concrete structure of terminals according to the present invention, the structure of liquid crystal displays and their terminal portions to which the present invention is applied is described. Though an example of a liquid crystal display device is cited for the description in the present specification, the invention can be applied to other display devices, for example, organic EL display devices.

Figure 10:
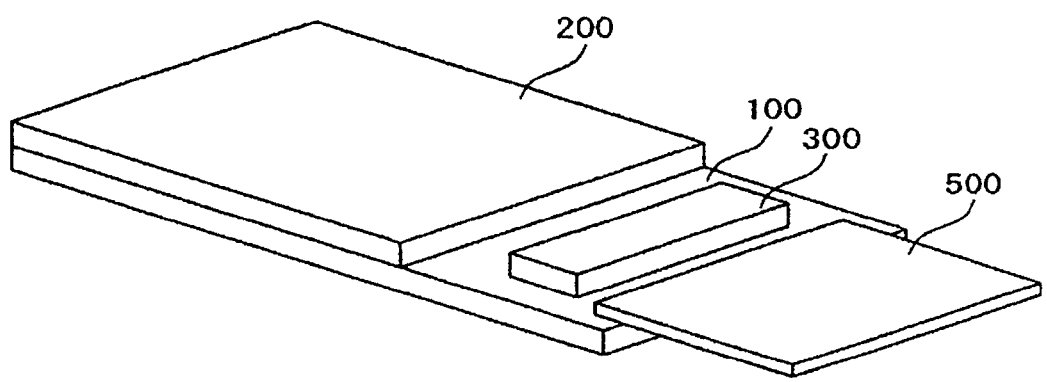
FIG. 10 is a perspective diagram showing the exterior of a display device.

FIG. 10 is a schematic diagram showing a liquid crystal display device to which the present invention is applied. FIG. 10 shows a compact liquid crystal display device that can be used in cellular phones. In FIG. 10, a facing substrate 200 is provided to a TFT substrate 100 where pixel electrodes, thin film transistors (TFT's) and the like are formed in a matrix so as to face the TFT substrate 100. Color filters are formed on the facing substrate 200 so as to correspond to pixel electrodes on the TFT substrate 100 so that pixels for colors are formed. Liquid crystal is sandwiched between the TFT substrate 100 and the facing substrate 200. The region where the liquid crystal is sandwiched form a display region made up of a large number of pixels.

Figure 11:
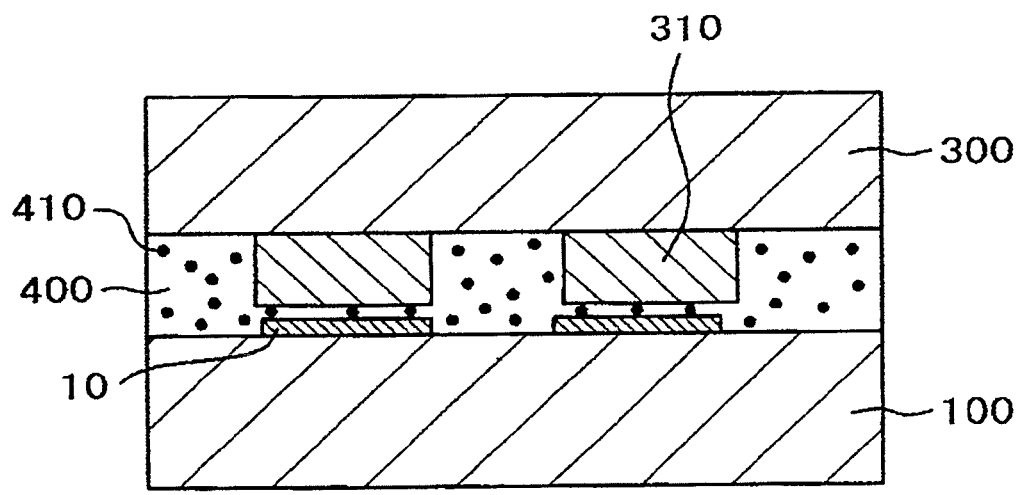
FIG. 11 is a diagram for illustrating the connection between a display device and an IC driver.

Though not shown, a number of scan signal lines and a number of video signal lines which cross these scan signal lines are formed in the display region in such a manner that predetermined signals can be supplied through these signal lines so as to drive the above described pixels, and these signal lines are connected to a below described IC driver 300 through their terminals (indicated by the symbol 10 in FIG. 11).

An IC driver 300 for driving each of the above described pixels is mounted on the region of the TFT substrate 100 which is exposed from the facing substrate 200, and a flexible wiring substrate 500 for supplying the power and signals to the above described IC driver 300 from the outside is connected to the region. As shown in FIG. 11, the IC driver 300 is connected to terminals 10 on the TFT substrate 100 via an anisotropic conductive film 400.

The terminals 10 formed on the TFT substrate 100 are formed of a wire metal, a contact hole and a transparent conductive film (ITO), which is clarified below, and simplified in FIG. 11. Bumps 310 are formed on the surface of the IC driver 300 that faces the TFT substrate 100, and these bumps 310 are electrically connected to the above described terminals 10 via the anisotropic conductive film 400. The anisotropic conductive film 400 is formed of a resin film in which conductive particles 410 are dispersed. The IC driver 300 adheres to the TFT substrate 100 through pressure so that the terminals 10 and the bumps 310 are electrically connected through conductive particles 410.

Figure 12:
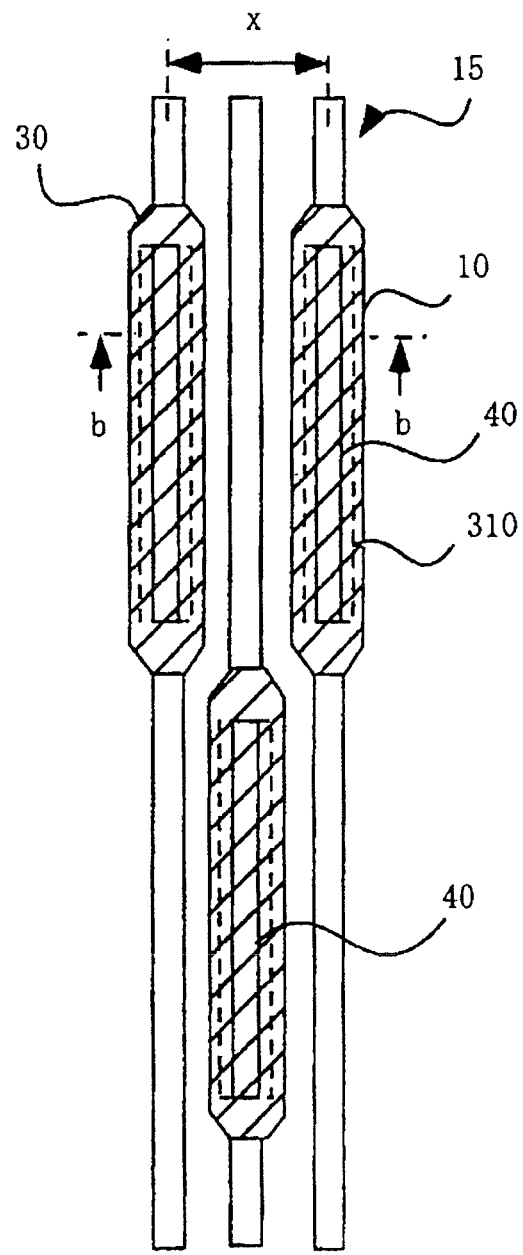
FIG. 12 is a plan diagram showing an example of a terminal structure in a display device.
Figure 13:
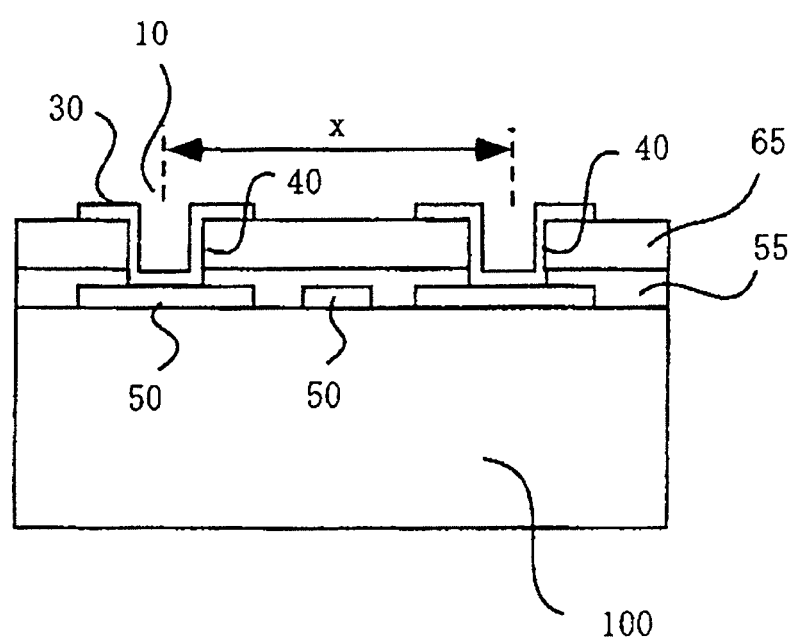
FIG. 13 is a cross sectional diagram along line b-b in FIG. 12.

FIGS. 12 and 13 are diagrams showing the details of terminal portions formed on the TFT substrate 100. FIG. 12 is a plan diagram showing the terminal portions. The upper half of FIG. 12 shows a display region and the lower half shows and end of the TFT substrate 100. FIG. 13 is a cross sectional diagram along line b-b in FIG. 12. In FIG. 12, terminals 10 are formed and arranged in zigzag because the pitch between wires is small. The pitch x between adjacent terminals 10 in the lateral direction in the figure is 36 μm, for example. In FIG. 12, a gate metal 50 is used for the terminal wires 15 in the lower layer. Here, the gate electrodes for the thin film transistors (hereinafter, in some cases referred to as TFT's) in the display region or a metal in the same layer as the gate electrodes are used for the gate metal 50, and therefore, it is referred to as gate metal. Here, the scan signal lines are also formed of the gate metal 50. Mo is used as the gate metal 50, for example. As shown in FIG. 12, the gate metal 50 is formed so as to be wider in the terminal 10 portions than the wire portions in the front and rear of the terminal portions. This is so in order to create contact holes 40. As shown in FIG. 13, a gate insulating film 55 and a passivation film 65 are formed and layered so as to cover the gate metal 50, and the above described contact holes 40 are created in the passivation film 65 and the gate insulating film 55. Here, the gate insulating film 55 and the passivation film 65 are formed so as to protect the gate metal 50.

The above described contact holes 40 expose part of the gate metal 50, and ITO 30, which is a transparent conductive film, is formed so as to cover the exposed gate metal 50. The ITO 30 is provided in order to protect the gate metal 50, and at the same time, make the connection with the bumps 310 of the IC driver 300 possible. The ITO 30 is formed wider than the contact holes 40. Though in this embodiment ITO is used for the transparent contact film, another transparent conductive film may be used. In FIG. 12, the hatched regions indicate where the ITO 30 is formed and the dotted line frames show the region that faces the bumps 310. The bumps 310 have approximately the same shape as the ITO 30 but are slightly smaller. Here, the bumps 310 are not shown in FIG. 13.

As described above, the pitch x of adjacent terminals 10 is 36 μm in this structure, which is possible to create through current processing technology. That is to say, in the case where the width of the gate metal 50 in the terminal portions is 20 μm, the distance between adjacent terminals 10 in the lateral direction in the zigzag arrangement is 16 μm. One terminal wire 15 runs between the adjacent terminals 10, and thus, approximately 5.3 μm can be secured as both the width of this terminal wire 15 and the distance between this terminal wire 15 and adjacent terminals 10, and therefore, it is possible to provide this structure through conventional microscopic processing. This means that microscopic processing is difficult in the case where the pitch x between adjacent terminals 10 is less than 36 μm.

Figure 14:
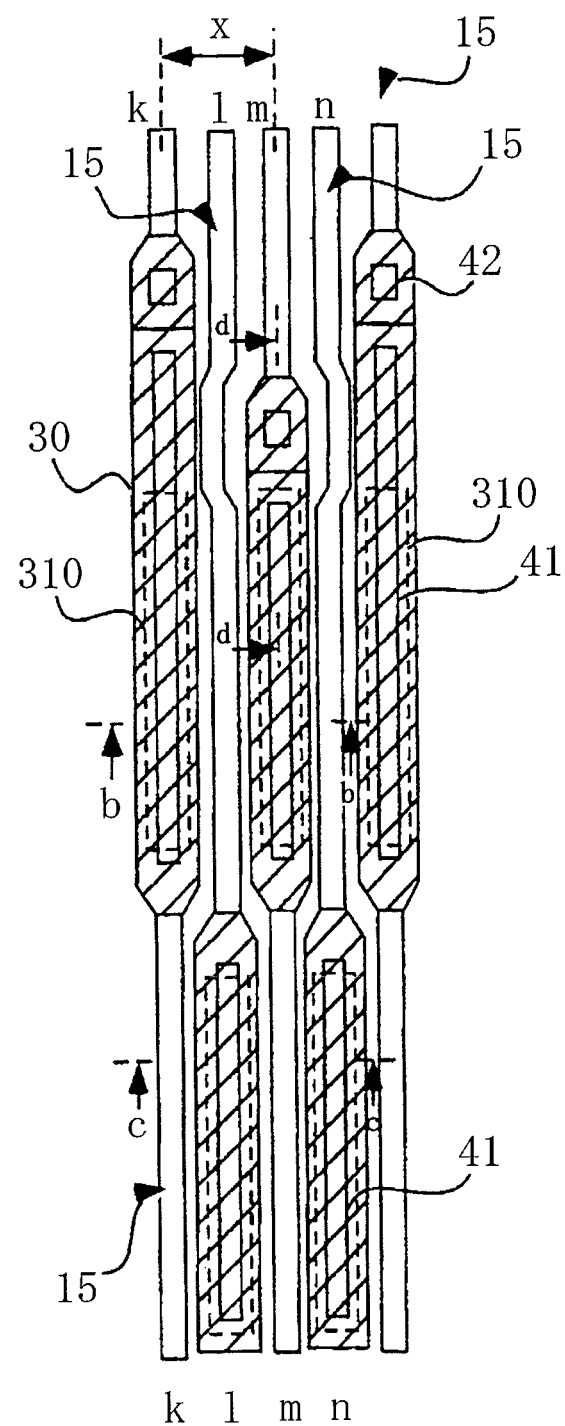
FIG. 14 is a plan diagram showing another example of a terminal structure in a display device.
Figure 15:
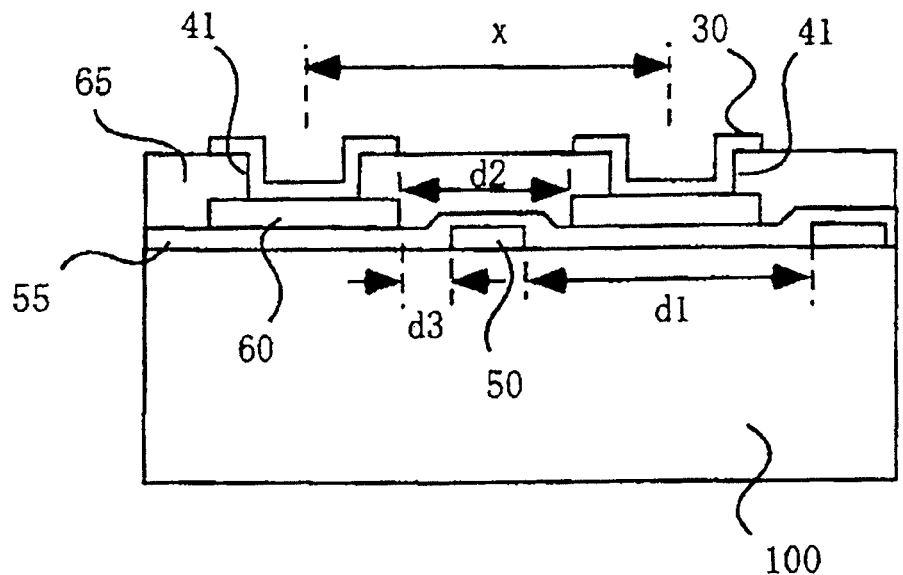
FIG. 15 is a cross sectional diagram along line b-b in FIG. 14.
Figure 16:
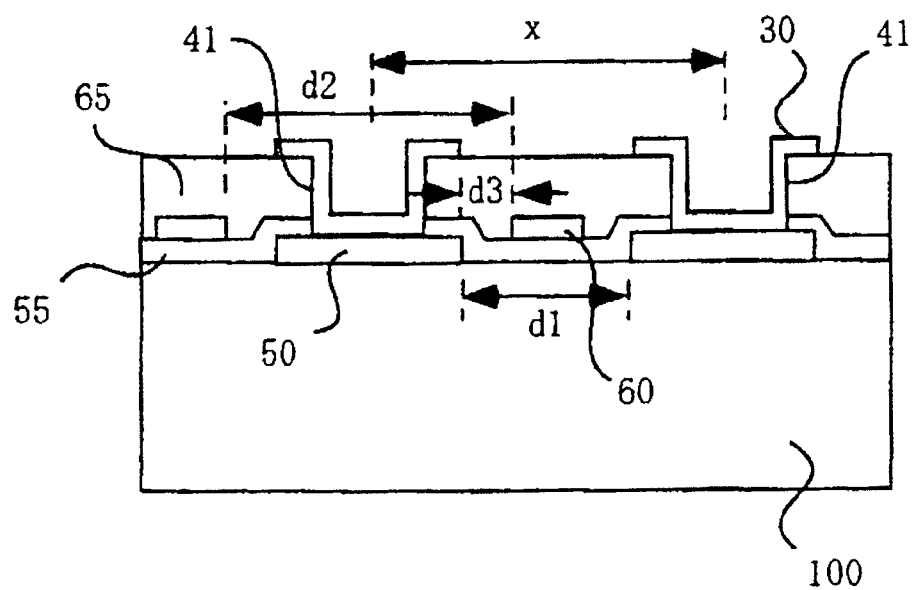
FIG. 16 is a cross sectional diagram along line c-c in FIG. 14.
Figure 17:
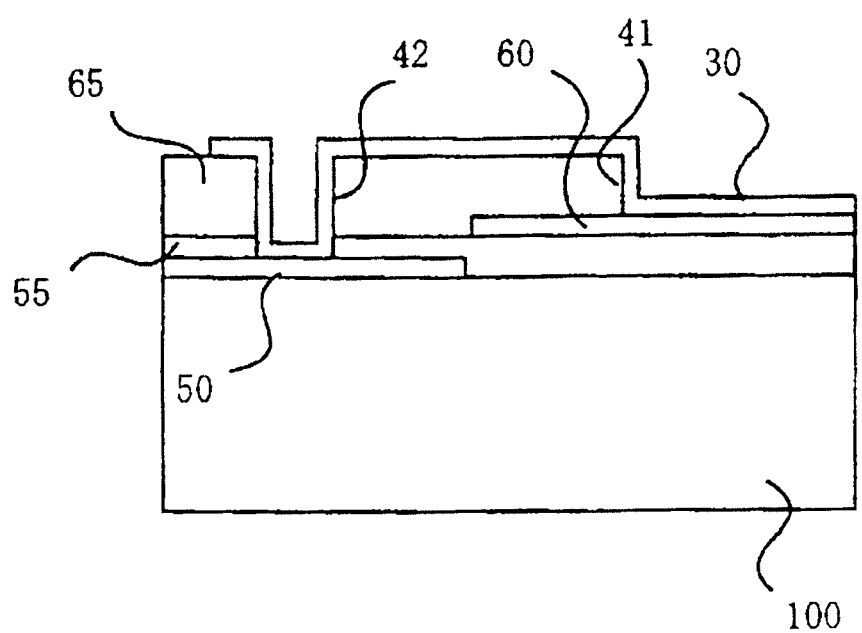
FIG. 17 is a cross sectional diagram along line d-d in FIG. 14.

FIGS. 14, 15, 16 and 17 show an example of the structure of terminal portions in a case where the pitch between wires is further smaller. FIG. 14 is a plan diagram showing terminal portions. The upper half of FIG. 14 shows a display region and the lower half shows an end of a TFT substrate 100. FIG. 15 is a cross sectional diagram along line b-b in FIG. 14, FIG. 16 is a cross sectional diagram along line c-c in FIG. 14, and FIG. 17 is a cross sectional diagram along line d-d in FIG. 14. The terminal portions shown in FIGS. 14, 15, 16 and 17 are characterized in that terminal wires 15 have a two-layer structure of a gate metal 50 and an SD metal 60. Here, a metal in the same layer as the source/drain electrodes of the TFT's in the display region is used for the SD metal 60, and therefore, this is referred to as SD metal. Here, video signal lines are also formed of the SD metal. Al is used for the SD metal 60, for example. A gate insulating film 55 provides interlayer insulation between the gate metal 50 and the SD metal 60. Here, the hatched regions in FIG. 14 are ITO 30.

In FIG. 14, terminal wires k, l, m and n lead out from the display region by means of the gate metal 50. The terminal wire k and the terminal wire m are switched to the SD metal 60 via contact holes 42 for wiring before they enter into the terminal portions. This structure is shown in FIG. 17, which shows a cross section along d-d along the terminal wire m.

In FIG. 17, the gate metal 50 extends to the portion for a contact hole 42 for wiring from the display region side. The contact hole 42 for wiring is created in the gate insulating film 55 and passivation film 65 so as to expose part of the gate metal 50. Meanwhile, a terminal wire 15 (terminal wire m) is formed of the SD metal 60 on the terminal 10 side. A contact hole 41 for wiring is created in the passivation film 65 on the terminal 10 side so as to expose part of the SD metal 60, which is the terminal wire 15 (terminal wire m). The ITO 30 covers both the contact hole 42 for wiring and the contact hole 41 for wiring so that the gate metal 50 and the terminal 10 are connected. The terminal wire k has the same structure.

Accordingly, the terminal wire k and the terminal wire m are provided by using the SD metal 60 as the terminal wires for the terminals 10. Meanwhile, the terminal wire l and the terminal wire n are provided by using the gate metal 50 that extends from the display region as the terminal wires for the terminals 10. Therefore, the terminal wires 15 that are wide in the terminal 10 portions (made of the SD metal 60 in the upper half of the zigzag arrangement in the figure and made of the gate metal 50 in the lower half of the figure) and the terminal wires 15 that are narrow running along the terminal 10 (made of the gate metal 50 in the upper half of the zigzag arrangement in the figure and made of the SD metal 60 in the lower half of the figure) are formed in different layers. A process is carried out layer by layer in accordance with a photolithographic technology, and therefore, no problem with the resolution arises during exposure to light.

FIG. 15 shows this state. In FIG. 15, the contact hole 41 for wiring connects the ITO 30 to the SD metal 60. The terminal wire 15 that is narrow running along the thick terminal wire 15 (SD metal 60) is formed of the gate metal 50. Thus, the margin in microscopic processing can be increased in comparison with the case where the terminal wires for the terminals 10 are formed in the same layer. That is to say, in FIG. 15, the distance between wires of the gate metal 50 that is in the first layer is d1 and the distance between wires of the SD metal 60 that is in the second layer is d2, and thus, they are large in comparison with the distance d3 between wires in the case where the terminal wires 15 are all arranged in the same layer.

Figure 6:
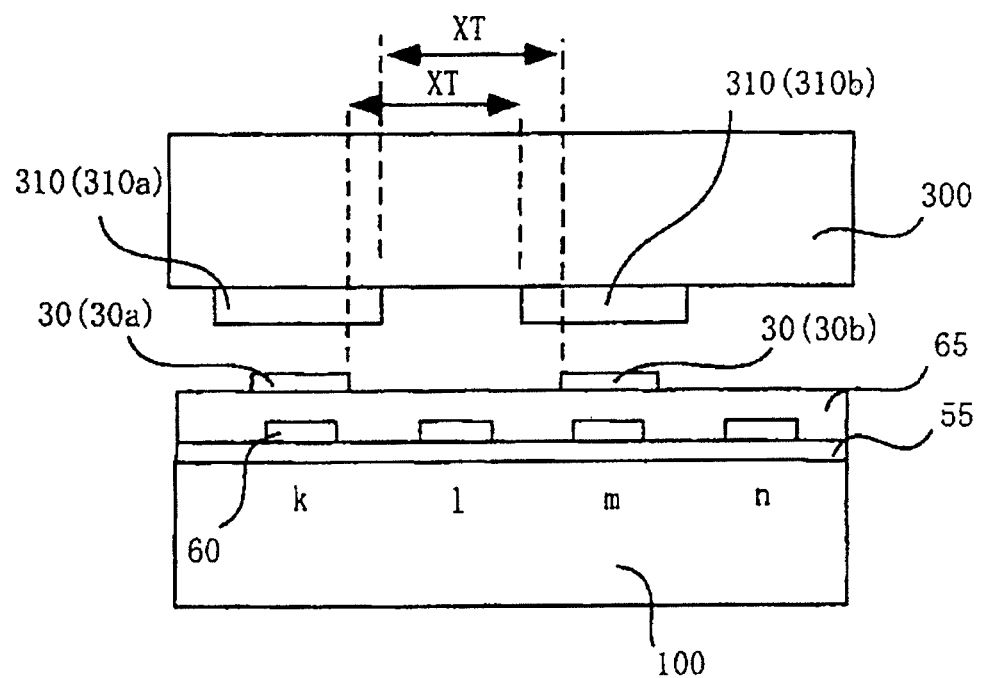
FIG. 6 is a cross sectional diagram along line b-b in FIG. 5.

In addition, as shown in FIG. 6, which shows another cross section of the terminal portions, the contact holes 41 for wiring connect the gate metal 50 to the ITO 30. The terminal wire 15 that is narrow running along the thick terminal wire 15 (gate metal 50) is formed of the SD metal 60. The gate metal 50 and the SD metal 60 are formed in different layers, and therefore, the margin in the photolithographic process, particularly exposure to light, can be increased in comparison with the case where they are formed in the same layer. In this case, the distance between the gate metal 50 wires is d1 and the distance between the SD metal 60 wires is d2, and thus, they are large in comparison with the distance d3 in the case where all the wires are formed in the same layer.

Though the structure shown in FIGS. 14, 15, 16 and 17 can overcome the problem with the resolution during the process for exposing terminal portions to light, it is inevitable for the wires in the terminal portions to have a two-layer structure. In the case of a two-layer structure, a problem with the matching of photomasks arises during the photolithographic process. In addition, in some cases, the gate metal 50 in the first layer and the SD metal 60 in the second layer overlap in the two-layer wires due to inaccuracy in the position of the mask. In such a case, the contact may be made between the gate metal 50 and the SD metal 60 when the insulating film is broken by a bump 310 of the IC driver 300 adhering through pressure, and a problem may arise when such contact may be made between terminal wires to which different signals are applied.

Taking these problems into consideration, it is better to form wires in the terminal portions in one layer, if possible.

First Embodiment

Figure 18:
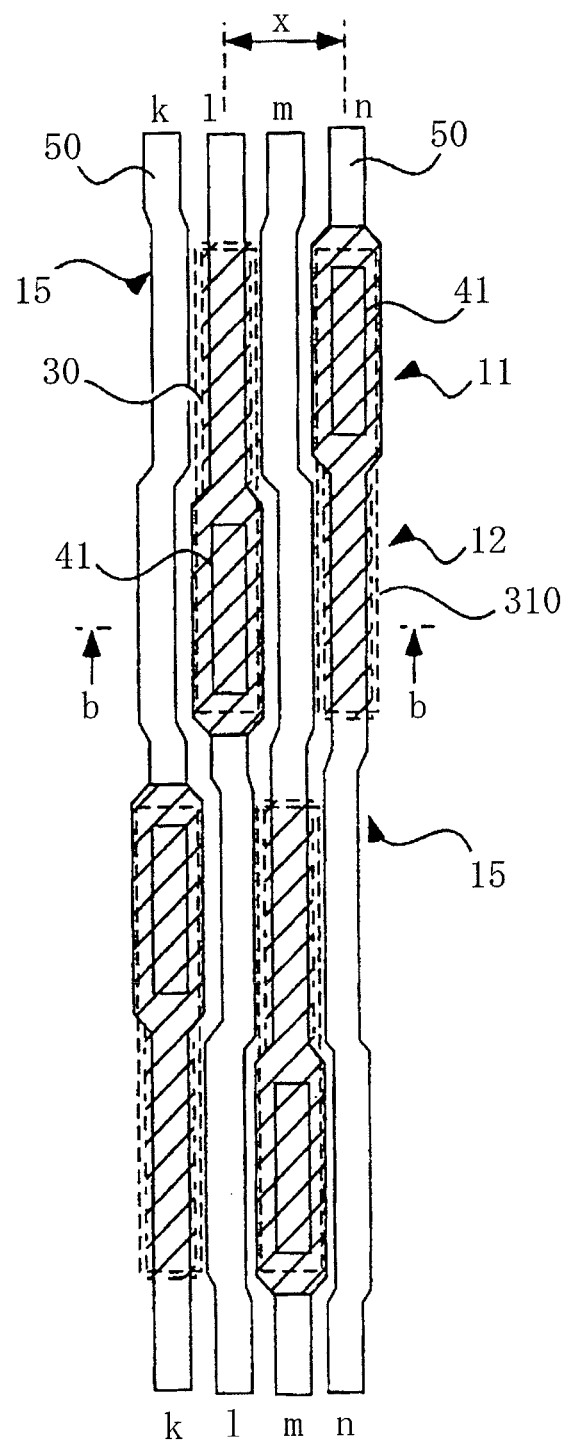
FIG. 18 is a plan diagram showing the display device according to the first embodiment of the present invention.
Figure 19:
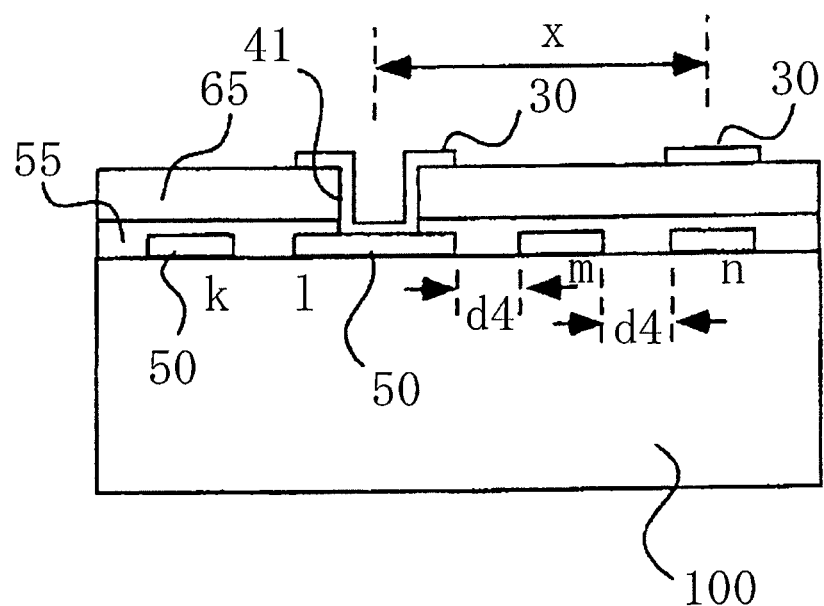
FIG. 19 is a cross sectional diagram along line b-b in FIG. 18.

FIGS. 18 and 19 show the first embodiment of the present invention. FIG. 18 is a plan diagram showing terminal portions, and the upper half in the figure shows a display region and the lower half shows an end of a TFT substrate 100. FIG. 19 is a cross sectional diagram along line b-b in FIG. 18.

In FIG. 18, terminal wires made of a gate metal 50 run from the display region side. The gate metal 50 has wide portions and narrow portions in the terminal portions. Contact holes 41 for a terminal are created in the wide portions of the gate metal 50. A certain width is necessary to create contact holes 41 for a terminal. Meanwhile, no contact holes 40 are created in the narrow portions of the gate metal 50 in the terminal portions. It is not necessary for the gate metal 50 to be wide, unless contact holes 40 are created.

This configuration is characterized in that one terminal 10 has a first portion 11 and a second portion 12, and a contact hole 41 for a terminal is created in the first portion 11 in order to connect the gate metal 50 to the ITO 30. Meanwhile, no contact hole 40 is created in the second portion 12, and only ITO 30 is formed on the passivation film 65. The ITO 30 in this portion is used solely for the connection to a bump 310 of an IC driver 300. Here, the thus formed ITO 30 corresponds to a terminal 10 in this, first embodiment, and ITO 30 and terminals 10 are synonymous in the following description. Here, when one of two adjacent terminals 10 in the same row (terminal 10 in the top row in the figure, for example) is a first terminal (terminal 10 in the terminal wire 1, for example) and the other terminal is a second terminal (terminal 10 in the terminal wire n, for example), the first portion 11 and the second portion in the region where the first terminal is formed, and the first portion 11 and the second portion in the region where the second terminal is formed are staggered.

In FIG. 18, the ITO 30 in the terminal portions is hatched. The ITO 30 has approximately the same shape as the gate metal 50 in the first portion 11, but is wider than the gate metal 50 in the second portion 12 (one dot chain line in the figure). The ITO 30 in the second portion 12 is narrower than the ITO 30 in the first portion 11.

Figure 20:
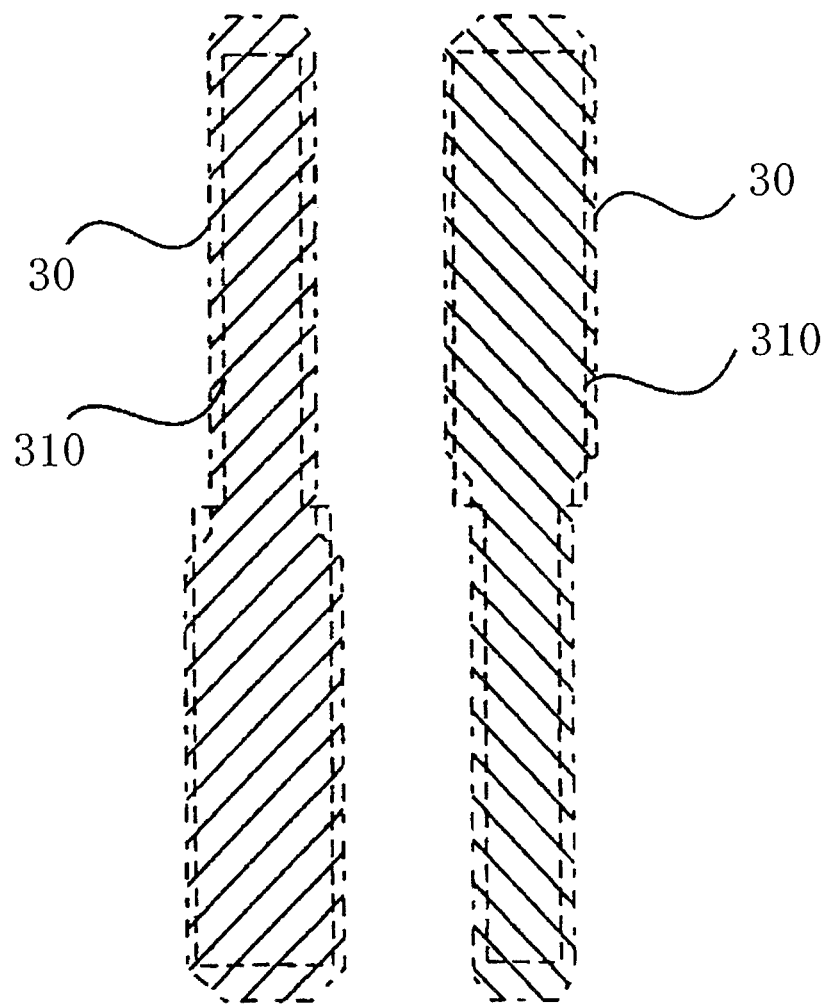
FIG. 20 is a diagram showing the relationship in the form between terminals (ITO) and bumps of an IC driver.

Portions corresponding to the bumps 310 of the IC driver 300 are shown by dotted lines in FIG. 1. In this, first embodiment, the above described bumps 310 have a wide portion corresponding to the wide portion of the terminal 10 and a narrow portion corresponding to the narrow portion of the terminal 10. Though the area of the contact holes 41 for a terminal is smaller, as described above, the area of contact between the bumps 310 and the ITO 30 is almost the same as in the prior art, and therefore, sufficient strength of adhesion can be secured between the IC driver 300 and the terminals 10. FIG. 20 is a diagram showing an enlargement of terminals 10 and bumps 310 of an IC driver 300, which are positioned as described above. In the figure, one dot chain line frames are the ITO 30 (terminals 10), and dotted line frames are bumps 310. As is clear from FIG. 20, the bumps 310 of the IC driver 300 are wide in the wide portion of the ITO 30 and narrow in the narrow portions of the ITO 30. In addition, the bumps 310 are formed so as to be slightly narrower than the ITO both in the wide and narrow portions. In addition, FIG. 20 shows a terminal 10 corresponding to the above described first terminal, and a terminal 10 corresponding to the second terminal aligned next to it. As is clear from FIG. 20, the wide portion and the narrow portion of the bump 310 that is connected to the terminal 10 corresponding to the first terminal (terminal 10 on the left in the figure, for example), and the wide portion and the narrow portion of the bump 310 that is connected to the terminal 10 corresponding to the second terminal (terminal 10 on the right in the figure) are staggered in the arrangement.

In FIG. 19, the terminal wires in the terminal portions are all in the same layer and formed of the same material (gate metal 50). Accordingly, adjacent terminal wires are formed in the same layer. The gate metal 50 is wide in the first portion 11 where a contact hole 41 for a terminal is created, and other portions (including the second portion 12) are narrower than the first portion 11. In FIG. 19, a gate insulating film 55 is formed on top of the gate metal 50 and a passivation film 65 is formed on top of the gate insulating film 55. A contact hole 41 for a terminal is created in the portion of the terminal wire l that corresponds to the first portion 11, so that the ITO 30 and the gate metal 50 make contact. A terminal wire m runs along the right side of the terminal wire l at a certain distance from it, and the second portion 12 of a terminal wire is to the right of the terminal wire m. The gate metal 50 is narrow in the portion of the terminal wire n corresponding to the second portion 12, and as wide as the terminal wire m. Meanwhile, ITO 30 is located above the terminal wire n with the gate insulating film 55 and the passivation film 65 in between. This ITO 30 is connected to the gate metal 50 through the contact hole 41 for a terminal created in the first portion 11 of the terminal wire n. The gate metal 50 is narrow in the second portion 12 of the terminal wire n, and therefore, the distance d4 between the gate metal 50 may be large enough that patterning through exposure to light is possible when the gate metal 50 is formed in the same plane.

The details are described below in reference to FIG. 18. In FIG. 18, the gate metal 50 is wider in the first portion 11 of the terminal wire l than in the second portion 12. Other terminal wires k and m made of the gate metal 50 adjacent to the terminal wire l are narrower than the first portion 11 of the terminal wire l in the region adjacent to the first portion 11, and formed so as to bend outward, away from the first portion of the terminal wire l. The terminal wires k and m are formed so as to bend outward, so that the distance between the first portion 11 of the terminal wire l, which is wide, and the terminal wire k or m is large enough that patterning is possible through exposure to light.

In this case, the terminal wires k and m bend outward, and there is a risk that the distance from the adjacent terminal wire may be too small. As shown in FIG. 28, however, the terminal wire n adjacent to the terminal wire m is the terminal 10 where no contact hole 41 for a terminal is created in the portion where the terminal wire 10 bends, for example. That is to say, this portion provides the structure of the second portion 12 of the terminal 10. In addition, the terminal wire n is as narrow as other portions in the second portion 12 where no contact hole 40 is created. Accordingly, the distance between the terminal wire n and the terminal wire m is large enough to make patterning through exposure to light possible. In this structure, patterning for wires through exposure to light is possible even when the pitch x of terminals 10 is 34 μm or less, as in FIGS. 18 and 19.

Figure 21:
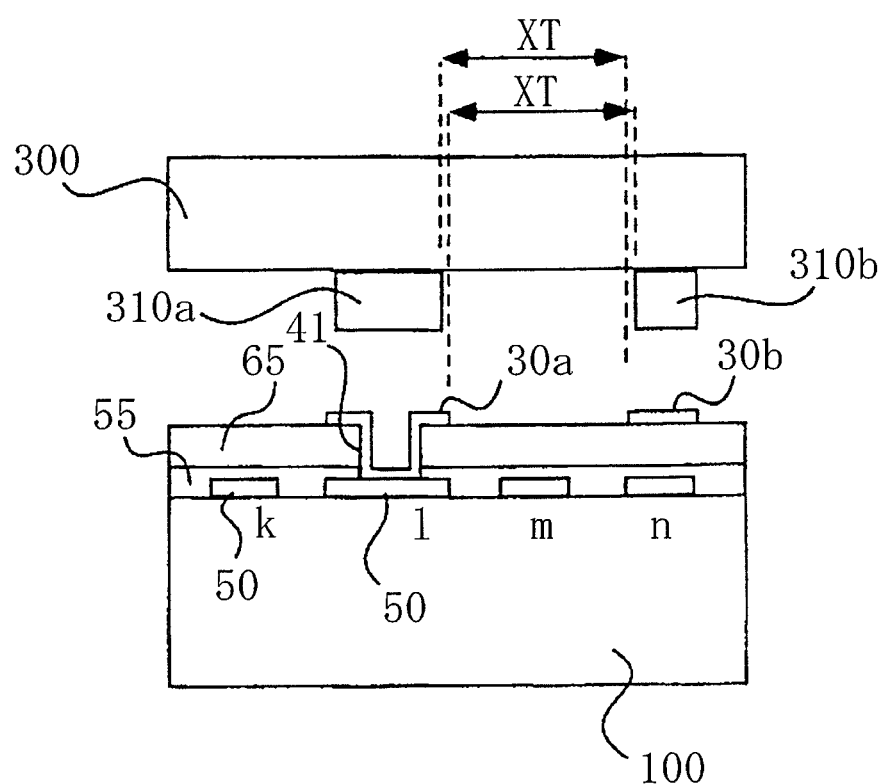
FIG. 21 is a cross sectional diagram for illustrating the effects of the present invention.

Furthermore, FIG. 21, which corresponds to FIG. 19, is a cross sectional diagram showing the positional relationship between the ITO 30 and the bumps 310 of an IC driver 300. In the present embodiment, as described above and shown in FIG. 21, bumps 310 are formed so as to have a wide portion corresponding to the wide portion of the ITO 30 and a narrow portion corresponding to the narrow portion of the ITO 30. Therefore, the bump 310 (310a in the figure) connected to the ITO 30 (30a in the figure) on top of the terminal wire l and the bump 310 (310b in the figure) connected to the ITO 30 (30b in the figure) on top of the terminal wire n have a different width in FIG. 21.

In this case, neither the distance XT between the ITO 30a and the bump 310b adjacent to the bump 310a of the IC driver 300 connected to this ITO 30a, nor the distance XT between the ITO 30b and the bump 310a adjacent to the bump 310b of the IC driver 300 connected to this ITO 30b is small, and thus, a maximal distance can be secured. Accordingly, even when the pitch of the terminal wires is small, such effects can be gained that a margin can be secured for preventing short-circuiting due to inaccurate mounting of the IC driver 300.

Figure 22:
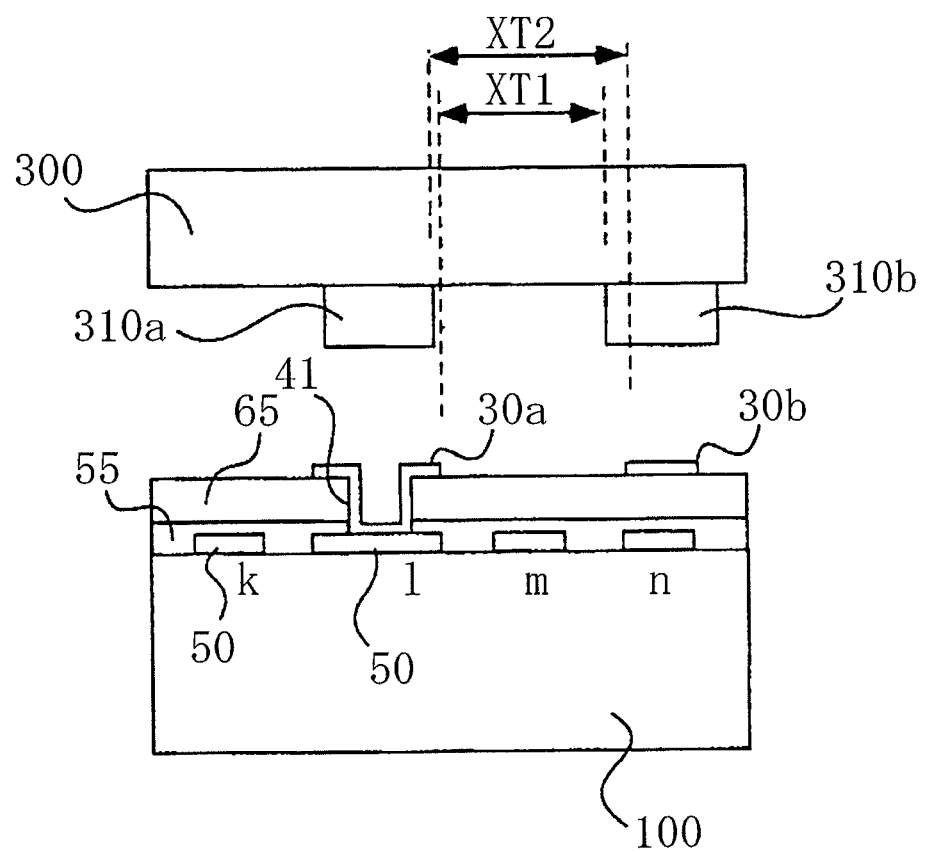
FIG. 22 is a cross sectional diagram illustrating a disadvantage in the case where the present invention is not applied.

Incidentally, FIG. 22 corresponds to FIG. 21 and shows a structure where the bumps 310 of the IC driver 300 have only thick portions corresponding to the width of the first portions 11 of the ITO 30. In this case, the distance XT1 between the ITO 30a in the first portion 11 of the terminal wire l and the bump 310b adjacent to the bump 310a of the IC driver 300 connected to this ITO 30a is smaller than the distance XT2 (having the same value as XT in FIG. 21) between the ITO 30b in the second portion of the terminal wire n and the bump 310a adjacent to the bump 310b of the IC driver 300 connected to this ITO 30b. Thus, there is a difference between the distance XT1 and the distance XT2, because there is a difference in the width of the terminal wire between the first portion 11 and the second portion 12 and the ITO 30 is formed in accordance with the width. In this case, a small pitch of the terminal wires is disadvantageous, in that the terminal in the first portion 11 of the terminal wire l has a small margin for short-circuiting due to inaccuracy when the IC driver 300 is mounted.

In the above described embodiment, the terminal wires are formed of the gate metal 50. However, the invention is not limited to this, and they may be formed of the SD metal 60, for example.

The following embodiments provide a structure where there is a larger margin for short-circuiting due to inaccuracy when the IC driver 300 is mounted.

Second Embodiment

Figure 2:
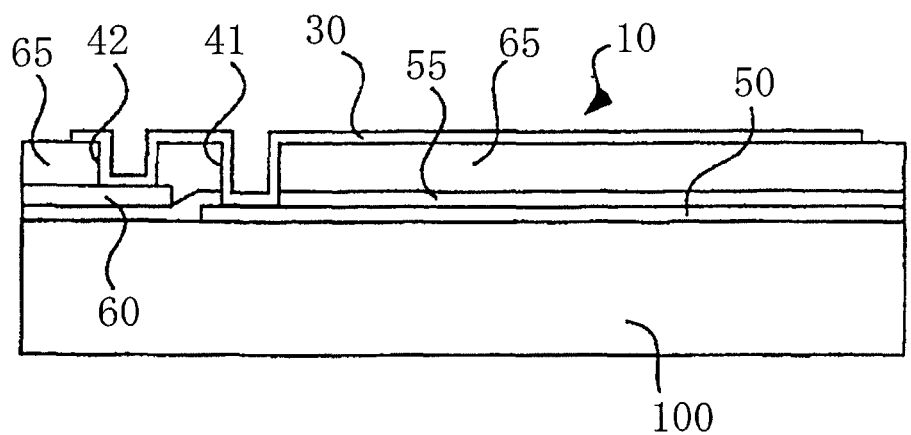
FIG. 2 is a cross sectional diagram along line b-b in FIG. 1.
Figure 3:
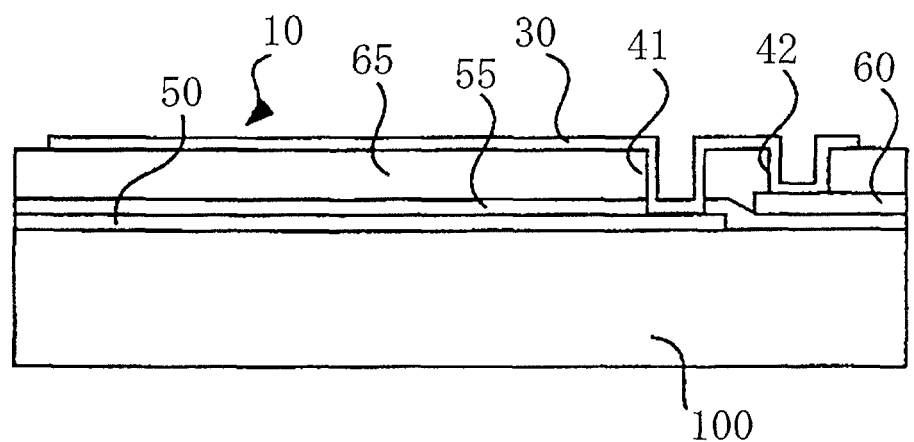
FIG. 3 is a cross sectional diagram along line c-c in FIG. 1.
Figure 4:
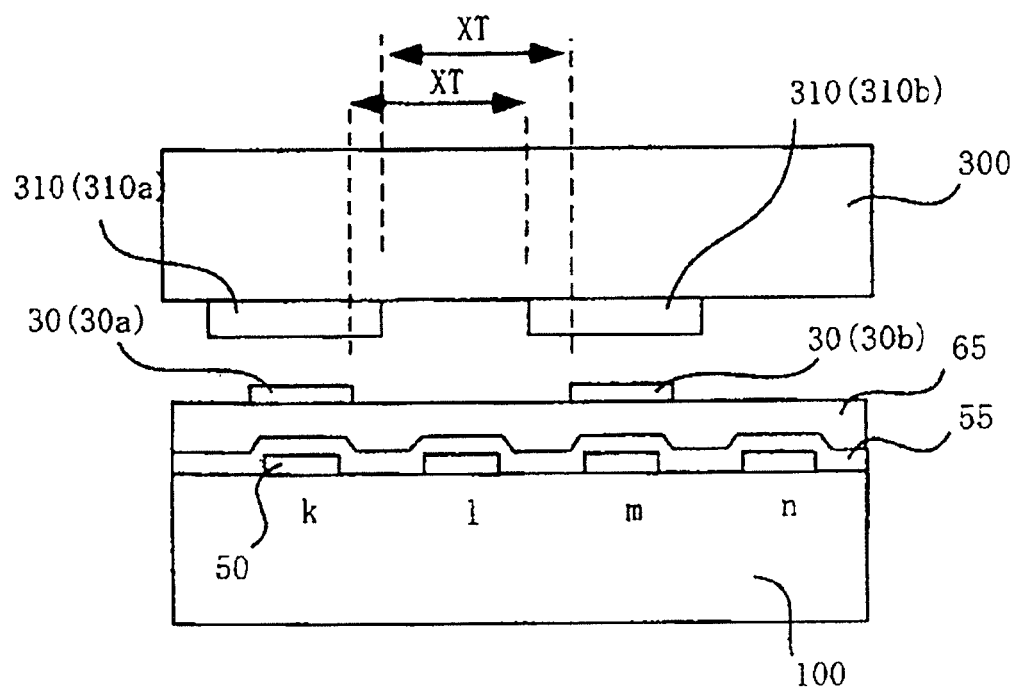
FIG. 4 is a cross sectional diagram along line d-d in FIG. 1.

FIGS. 1 to 4 show the second embodiment of the present invention. FIG. 1 is a plan diagram showing the second embodiment. The upper half of FIG. 1 shows a display region, and the lower half of the figure shows an end of the TFT substrate 100. FIG. 2 is a cross sectional diagram along line b-b in FIG. 1, FIG. 3 is a cross sectional diagram along line c-c in FIG. 1, and FIG. 4 is a cross sectional diagram along line d-d in FIG. 1. In this, second embodiment, terminal wires 15 have a two-layer structure of a gate metal 50 and an SD metal 60. Though the present invention can also be used in cases where there is only one layer of wires in the terminal portions, as in the third embodiment, the terminal wires 15 are allowed to have a two-layer structure when the disadvantage of inaccuracy in the positioning of the mask during the photolithographic process in FIGS. 14 to 17 is unimportant.

In FIG. 1, terminal wires k and m lead out from the display region through an SD metal 60, for example, and switch to the gate metal 50 via the contact hole 42 for a wire and the contact hole 41 for a terminal before entering the terminal portion. In this case, the portions where the terminal wires 15 are switched are slightly staggered in the direction in which the terminal wires 15 run, as in the above described embodiment. As shown in FIG. 2, the terminal wire m is made of the SD metal 60 extending from the display region to the contact hole 42 for a wire. The contact hole 42 for a wire is created in the passivation film 65 so as to expose part of the SD metal 60. Meanwhile, a terminal wire 15 (terminal wire m) is formed of the gate metal 50 on the terminal 10 side. A contact hole 41 for a terminal is created in the gate insulating film 55 and the passivation film 65 on the terminal 10 side, so as to expose part of the gate metal 50 which is the terminal wire 15 (terminal wire m). In this case, the contact hole 42 for a wire and the contact hole 41 for a terminal are provided in order to electrically connect the SD metal 60 to the gate metal 50 and the below described ITO 30 which functions as a terminal 10. That is to say, the contact hole 41 for a terminal is created in a different portion from the below described terminal 10, and the contact hole 41 and the terminal 10 are adjacent to each other in the direction in which the terminal wire m runs. As a result, the contact hole 41 for a terminal is relatively short in the direction in which the terminal wire m runs, as is the wide portion of the gate metal 50. The ITO 30 is formed so as to cover both the contact hole 42 for a wire and the contact hole 41 for a terminal, so that the SD metal 60 and the gate metal 50 are electrically connected. In this case, the ITO 30 runs vertically in FIG. 1 and overlaps with the gate metal 50 so as to form a relatively long terminal 10. This terminal 10 is slightly wider than the gate metal 50, and narrower than the SD metal 60 in the contact hole 42 for a wire and the gate metal 50 in the contact hole 41 for a terminal. The terminal wire k has the same structure. As a result, the terminals 10 of the terminal wire k and the terminal wire m are formed in portions facing the bumps 310 of the IC driver 300 (dot line frames in the figure) with a passivation film 65 in between above the gate metal 50. Here, the terminals 10 of the terminal wire k and the terminal wire m are staggered in the arrangement, in the top rows in the figure.

Meanwhile, the terminal wire l and the terminal wire n form terminals 10 of ITO 30, which are aligned so as to be staggered in the lower half in the figure, where the gate metal 50 running from the display region overlaps with the terminal wires 15 through contact holes 41 for a terminal. In the terminal wire l, for example, as shown in FIG. 3, the gate metal 50 extends to the contact hole 41 for a terminal from the display region. The contact hole 41 for a wire is created in the gate insulating film 55 and the passivation film 65 so as to expose part of the gate metal 50. In addition, the above described gate metal 50 is switched to the SD metal 60, and part of the above described SD metal 60 is exposed through the contact hole 42 for a wire formed on the passivation film 65. In this case, the contact hole 42 for a wire and the contact hole 41 for a terminal are provided in order to electrically connect the gate metal 50 to the SD metal 60 through the below described ITO 30 that works as a terminal 10. That is to say, the contact hole 41 for a terminal is created in a different portion from the below described terminal 10, and the contact hole 41 and the terminal 10 are adjacent to each other in the direction in which the terminal wire l runs. As a result, the contact hole 41 for a terminal is relatively short in the direction in which the terminal wire l runs, as is the wide portion of the gate metal 50. The ITO 30 is formed so as to cover both the contact hole 42 for a wire and the contact hole 41 for a terminal, so that the gate metal 50 and the SD metal 60 are electrically connected. In this case, the ITO 30 runs vertically in FIG. 1 and overlaps with the gate metal 55 so as to form a relatively long terminal 10. This terminal 10 is slightly wider than the gate metal 50, and narrower than the gate metal 50 in the contact hole 41 for a terminal and the SD metal 60 in the contact hole 42 for a wire. The terminal wire n has the same structure. Accordingly, the terminals 10 of the terminal wire l and the terminal wire n are formed in portions connected to the bumps 310 of the IC driver 300 (dot line frames in the figure) with a passivation film 65 in between above the gate metal 50. Here, the terminals 10 of the terminal wire l and the terminal wire n are staggered in the arrangement, in the bottom rows in the figure.

Here, the portions of the terminal wires k and m which are adjacent to the portions where the terminal wires k and m are switched to the terminal wires l and n (regions where the contact hole 42 for a wire and the contact hole 41 for a terminal are created) are formed so as to bend in order to avoid interference with the above described switching portions. In addition, the portions of the terminal wires l and n which are adjacent to the portions where the terminal wires l and n are switched to the terminal wires k and m (regions where the contact hole 41 for a terminal and the contact hole 42 for a wire are created) are formed so as to bend in order to avoid interference with the above described switching portions. This is in order to position adjacent terminal wires close to each other.

FIG. 4 shows a cross section along the top row of terminals 10 in the figure from among the terminals 10 that are staggered in the arrangement. FIG. 4 also shows an IC driver 300 with bumps 310 that are connected to the terminals 10. In FIG. 4, terminal wires k, l, m and n are formed of a gate metal 50 on the upper surface of the substrate 100, and a gate insulating film 55 and a passivation film 65 are layered on the upper surface of these terminal wires k, l, m and n. In addition, terminals 10 are formed of ITO 30 on the upper surface of the passivation film 65 so as to overlap with the terminal wires k and m. No contact holes 41 for a terminal are created in the terminals 10, which are part of the IPO 30 connected to the bumps 310 of the IC driver 300 in order to make contact with the terminal wire k or m. The contact holes 41 for a terminal are created outside the region where the above described terminals 10 are formed. Therefore, the terminals 10 formed so as to overlap with the terminal wires k and m are formed so as to be slightly wider than the terminal wires k and m, and narrower than the ITO 30 formed in the contact holes 41 for a terminal.

As a result, neither the distance XT between the ITO 30 on top of the terminal wire k (indicated by 30a in the figure) and the bump 310 adjacent to the bump 310 of the IC driver 300 connected to this ITO 30a (indicated by 310a in the figure), nor the distance XT between the ITO 30 on top of the terminal wire m (indicated by 30b in the figure) and the bump 310a adjacent to the bump 310b of the IC driver 300 connected to this ITO 30b is small, and thus, a maximal distance can be secured. Accordingly, even when the pitch of the terminal wires is small, a margin can be secured for preventing short-circuiting due to inaccurate mounting of the IC driver 300.

Third Embodiment

During the process for manufacturing a display device, there is a step of inspecting wires formed in the display device for short-circuiting at a stage before the IC driver is mounted. TFT switches, inspection wires and the like required for this inspection are formed in a region where the IC driver is to be mounted; that is to say, in the region that is hidden once the IC driver is mounted. There is a strong demand for larger display regions and smaller frames in display devices. It is preferable for the area occupied by the TFT switches, the inspection wires and the like for inspection to be as small as possible, in order to make the frame smaller.

Figure 5:
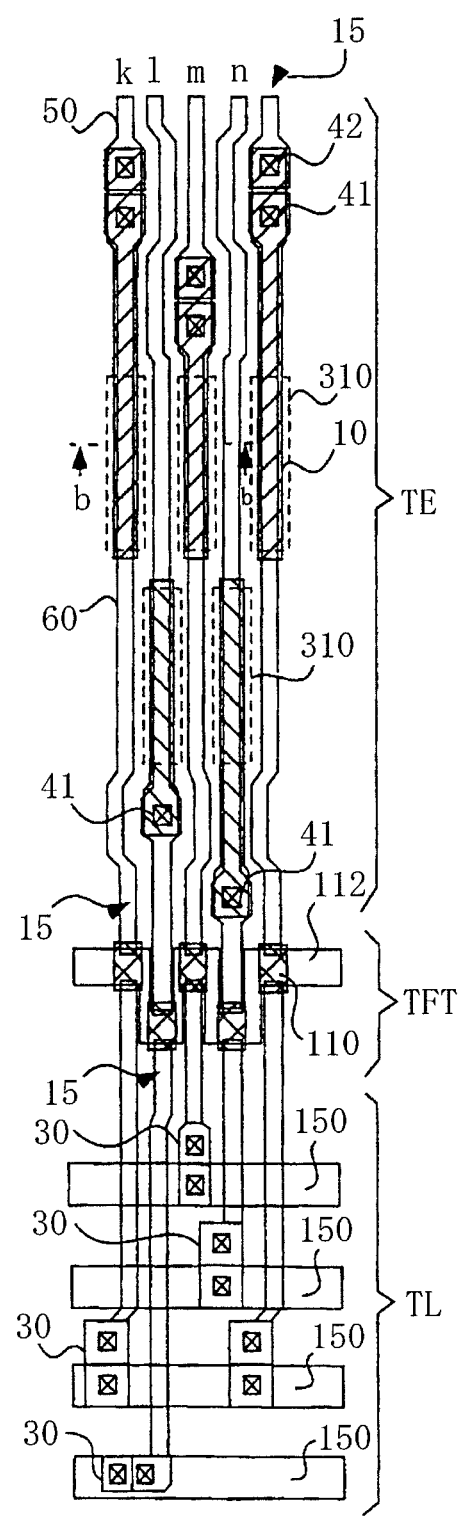
FIG. 5 is a plan diagram showing the display device according to the third embodiment of the present invention.

FIGS. 5 and 6 show the configuration according to the third embodiment, where the pitch between wires in the terminal portions, as well as the area occupied by the TFT's 100 for inspection and the wires 150 for inspection, is small. FIG. 5 is a plan diagram showing the present embodiment. The upper half of FIG. 5 shows a display region, and the lower half of the figure shows an end of a TFT substrate 100. In FIG. 5, the region TE in the upper half of the figure provides terminal portions for connection to an IC driver 300, and a region TFT where TFT's 110 for inspection are formed is provided beneath the region TE in the figure, and furthermore, a region TL where wires 150 for inspection are formed is provided at the bottom in the figure.

In the configuration in FIG. 5, a region where switching terminals for switching the terminal wires 15 from the gate metal 50 to the SD metal 60 are formed is not required between the region TE and the region TFT. As a result, the region occupied by the TFT switches for inspection, the wires for inspection and the like is small. This structure can be achieved by forming the terminal wires k, l, m and n running in a layer beneath the terminals 10 of an SD metal 60 in the region TE. That is to say, in FIG. 5, the terminal wires k and m lead out from the display region through a gate metal 50, for example, and switch to an SD metal 60 through the contact hole 42 for a wire and the contact hole 41 for a terminal before reaching the terminals 10. The terminal wires l and n lead out from the display region through an SD metal 60, and this SD metal extends to the contact hole 41 for a terminal. As a result, the terminal wires k, l, m and n are all formed of an SD metal 60 before reaching the region TFT where TFT's 110 for inspection are formed, and thus can be electrically connected to the source/drain of the TFT's 110 for inspection without requiring switching. This is because the TFT's 110 for inspection are formed parallel to the TFT's within the pixels, and the source/drain electrodes are formed of the SD metal 60.

Here, the configuration in the above described region TE is different from the configuration in FIG. 1 in that the terminal wires k, l, m and n running in a layer beneath the terminals 10 are formed of an SD metal 60 and the wires l and n do not have a contact hole for a wire for switching, but otherwise is the same. FIG. 6 is a cross sectional diagram along line b-b in FIG. 1. In FIG. 6, the size and positional relationship of the terminals 10 and the bumps 310 of the IC driver 300 are the same as in FIG. 4. Thus, the same effects as in the first embodiment can be gained in the region TE.

Returning to FIG. 5, as described above, the TFT's 110 for inspection are formed through the same process as the TFT's within the pixels. Accordingly, the source/drain electrodes of the TFT's 110 for inspection are made of an SD metal 60. Here, the gate electrodes 112 of the TFT's 110 for inspection that are connected to the terminal wires k, l, m and n are formed at the same time, and the TFT's 110 for inspection are staggered in the alignment, and therefore, the wire winds through the gate electrodes 112. As a result, regions which overlap with the terminal wires k, l, m and n are as small as they can be, and thus the parasitic capacitance is lower.

The wires 150 for inspection run horizontally beneath the TFT's for inspection in the figure, so that they can supply a signal for inspecting wires for short-circuiting. The wires 150 for inspection are formed of a gate metal 50. The wires 150 for inspection formed of a gate metal 50 switch to the source/drain electrodes of the TFT's for inspection formed of an SD metal 60 in the above described configuration using contact holes. There are four wires 150 for inspection, for example, which run horizontally in the figure. Thus, four wire circuits can be inspected for short-circuiting. This is because in this embodiment, two-layer wires of the gate metal 50 and the SD metal 60 are used for the terminal wires, and therefore, it is necessary to check wires in the same layer and wires in different layers. Terminal wires k and m in the same layer, as well as terminal wires l and n in the same layer, are checked for short-circuiting, as are terminal wires k and l, terminal wires l and m, and terminal wires m and n in different layers. All of the wires can be checked by repeating this. Accordingly, four wires 150 for inspection makes it possible to check all of the terminal wires for short-circuiting.

Here, though the wires 150 for inspection in FIG. 5 run horizontally in the figure with a constant width, they may bend, so that the area across which they cross the terminal wires 15 made of an SD metal 60 is smaller and their capacitance with the terminal wires is lower. In addition, a semiconductor layer can be made as an interlayer insulating film, together with the gate insulating film 55m, between the terminal wires 15 made of an SD metal 60 and the wires 150 for inspection made of a gate metal 50, so that the capacitance is lower.

Fourth Embodiment

Figure 7:
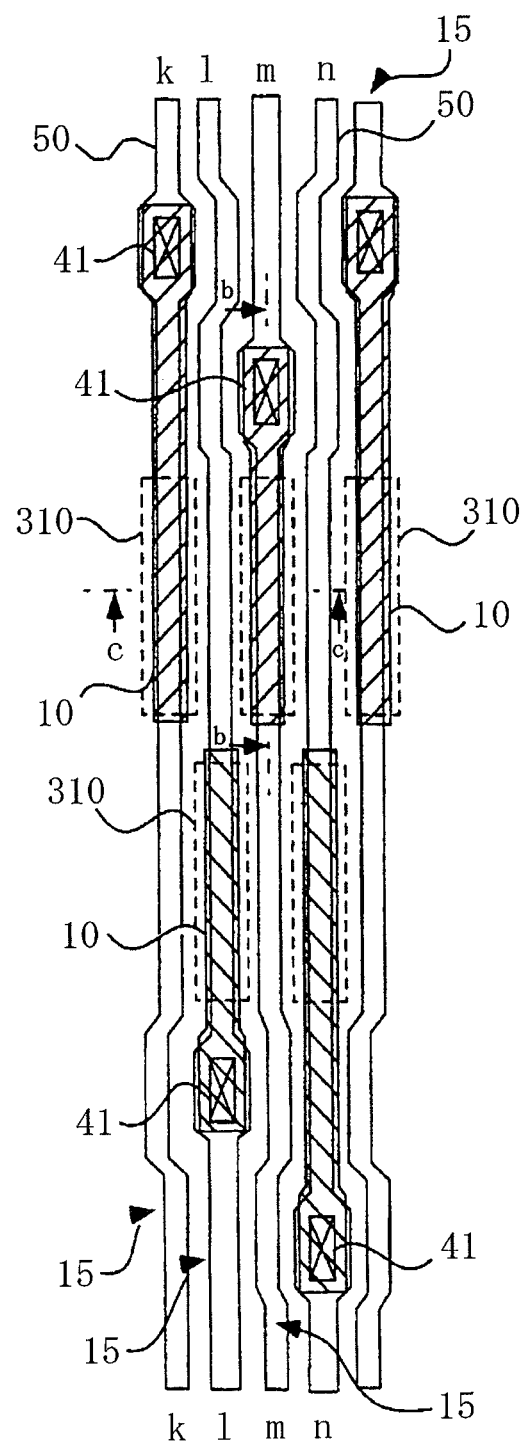
FIG. 7 is a plan diagram showing the display device according to the fourth embodiment of the present invention.
Figure 8:
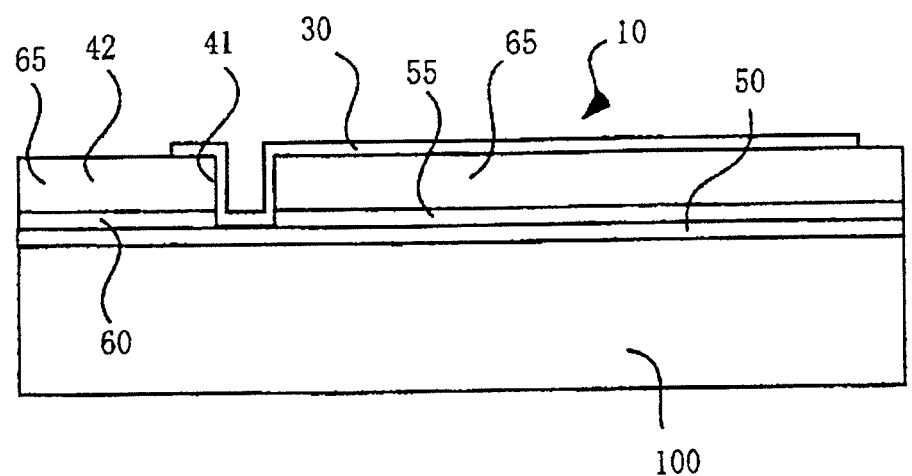
FIG. 8 is a cross sectional diagram along line b-b in FIG. 7.
Figure 9:
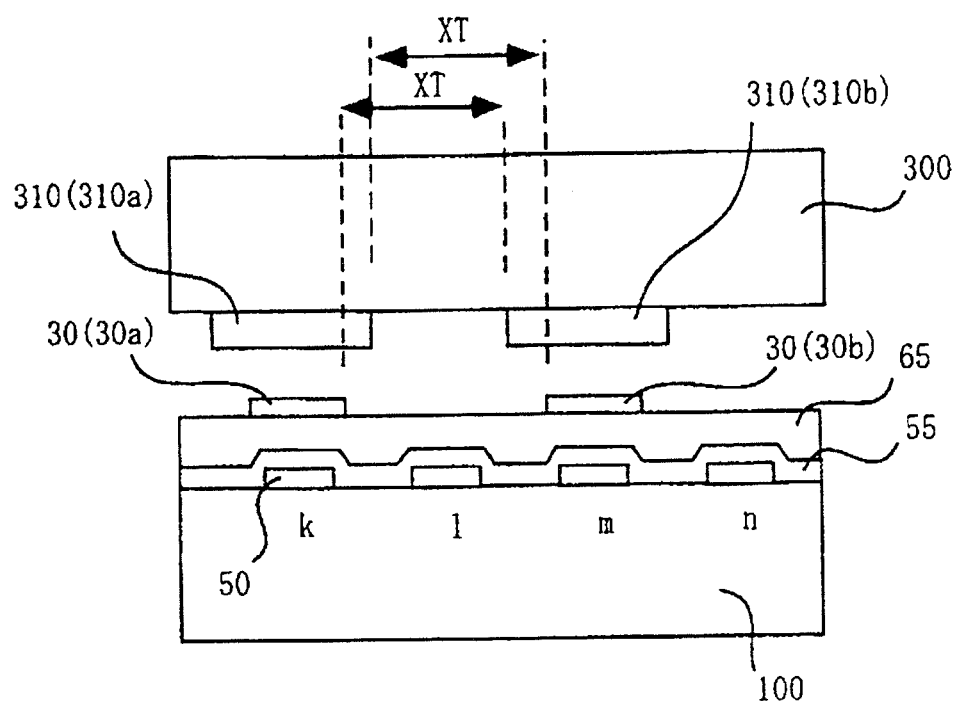
FIG. 9 is a cross sectional diagram along line c-c in FIG. 7.

FIGS. 7, 8 and 9 show the fourth embodiment of the present invention. FIG. 7 is a plan diagram showing the fourth embodiment. The upper half of FIG. 7 shows a display region, and the lower half in the figure shows an end of the TFT substrate 100. FIG. 8 is a cross sectional diagram along line b-b in FIG. 7, and FIG. 9 is a cross sectional diagram along line C-C in FIG. 7. In this embodiment, the terminal wires 15 have a one-layer structure of a gate metal 50. In this case, there is no risk of there being any inaccuracy in the position of the mask for forming the terminal wires 15, and therefore, the distance between adjacent terminals is smaller than in the configuration in FIGS. 1, 2, 3 and 4, for example.

In FIG. 7, terminal wires k, l, m and n lead out from the display region through the gate metal 50, and from among these, the terminal wires k and m are provided with a contact hole 41 for a terminal before entering the terminal portions. The portion of the terminal wires k and m in which a contact hole 41 for a terminal is created is wider. The portions of the terminal wires k and m in which contact holes 41 for a terminal are created are slightly staggered in the direction in which the terminal wires 15 run in the arrangement. As shown in FIG. 8, the terminal wire m is formed of the gate metal 50 that runs from the display region past the contact hole 41 for a terminal. The contact hole 42 for a terminal is created in the gate insulating film 50 and the passivation film 65 so as to expose part of the gate metal 50. The terminals 10 are formed of an ITO 30 which covers the contact hole 41 for a terminal and overlaps with the terminal wires 15 on the bottom side in the figure (the terminal portion side of the TFT substrate 100). The ITO 30 is formed so as to be wide in the region where the contact holes for a terminal are created and narrow in the region where the terminals 10 are formed. However, the ITO 30 is wider than the terminal wire 15 in the region where the terminals 10 are formed. The terminal wire k has the same structure. As a result, the terminals 10 of the terminal wires k and m are formed above the gate metal 50 with the passivation film 65 in between in the portions connected to the bumps 310 of the IC driver 300 (indicated by dot line frame in the figure). Here, the terminals 10 of the terminal wires k and m are staggered in the arrangement in the upper half in the figure.

Meanwhile, the terminal wire l and the terminal wire n form terminals 10 of ITO 30, which are aligned so as to be staggered in the lower half in the figure, where the gate metal 50 running from the display region overlaps with the terminal wires 15 through contact holes 41 for a terminal. In this case, the ITO 30 is formed so as to overlap with the terminal wires 15 on the top side in the figure (on the display region side) and the cross section along a terminal wire 15 is approximately the same as in FIG. 8.

Here, the portions of the terminal wires k and m which are adjacent to the region of the terminal wires l and n where a contact hole 41 for a terminal is created are formed so as to bend, in order to avoid interference with these regions. In addition, the portions of the terminal wires l and n which are adjacent to the region of the terminal wires k and m where a contact hole 41 for a terminal is created are formed so as to bend, in order to avoid interference with these regions. This is in order to position the adjacent terminal wires close to each other.

In the case of this configuration also, FIG. 9, which is a cross sectional diagram along line c-c in FIG. 7, shows the same cross section as FIG. 4, and there is a larger margin for short-circuiting due to inaccuracy when an IC driver 300 is mounted. That is to say, neither the distance XT between the ITO 30 on top of the terminal wire k (indicated by 30a in the figure) and the bump 310 adjacent to the bump 310 of the IC driver 300 connected to this ITO 30a (indicated by 310a in the figure), nor the distance XT between the ITO 30 on top of the terminal wire m (indicated by 30b in the figure) and the bump 310a adjacent to the bump 310b of the IC driver 300 connected to this ITO 30b is small, and thus, a maximal distance can be secured.

Here, though in this, fourth embodiment, the terminal wires 15 are formed of a gate metal 50, they may be made of an SD metal 60. In the case where the terminal wires 15 are made of an SD metal 60, it is not necessary to form switching portions when the structure allows these terminal wires 15 to be connected to TFT's 110 for inspection (see FIG. 5), and therefore, it is not necessary to secure an area for forming switching portions.

The above descriptions are for a liquid crystal display device. However, the structure of the terminals 10 in other display devices, such as organic EL display devices, is basically the same as in liquid crystal display devices. Therefore, the present invention can be applied to other display devices as well, such as organic EL display devices.

Though the present invention is described using the above embodiments, the structures in these embodiments are merely examples, and various modifications are possible for the present invention, as long as the technical idea is not deviated from. In addition, the structures in these embodiments may be combined for use, as long as they are compatible.

What is claimed is:

1. A display device, comprising:
   a substrate having a display region so that signal lines formed within the display region are connected to respective terminals in a terminal group formed outside the display region via terminal wires; and
   an IC driver having bumps respectively facing and being connected to the terminals via an isotropic conductive film;
   wherein the terminal wires have a first terminal wire, a second terminal wire, a third terminal wire, and a fourth terminal wire, the terminals have a first terminal connected to the first terminal wire, a second terminal connected to the second terminal wire, a third terminal connected to the third terminal wire, and a fourth terminal connected to the fourth terminal wire, the first terminal and the second terminal are staggered with respect to each other, the second terminal and the third terminal are staggered with respect to each other, and the third terminal and the fourth terminal are staggered with respect to each other;
   wherein the first terminal, the second terminal, the third terminal, and the fourth terminal respectively have a wide portion and a narrow portion which is narrower than the wide portion, the first terminal and the third terminal are adjacent to each other in the direction perpendicular to the direction in which the terminal wires run, the second terminal and the fourth terminal are adjacent to each other in the direction perpendicular to the direction in which the terminal wires run;
   wherein the first terminal, the second terminal, the third terminal, and the fourth terminal are formed of a transparent conductive film;
   wherein the bumps of the IC driver have a first bump connected to the first terminal via the isotropic conductive film, a second pump connected to the second terminal via the isotropic conductive film, a third bump connected to the third terminal via the isotropic conductive film, and a fourth bump connected to the fourth terminal via the isotropic conductive film;
   the substrate includes the display region, a first region comprising the IC driver, the terminal wires, the terminals, and the bumps of the IC driver, a second region comprising TFT switches for inspection, and a third region comprising inspection wires;
   wherein the display region, the first region, the second region, and the third region are arranged in this order;
   wherein the TFT switches for inspection include a first TFT switch for inspection connected to the first terminal wire, a second TFT switch for inspection connected to the second terminal wire, a third TFT switch for inspection connected to the third terminal wire, a fourth TFT switch for inspection connected to the fourth terminal wire; and
   wherein the inspection wires include a first inspection wire electrically connected to the first TFT switch, a second inspection wire electrically connected to the second TFT switch, a third inspection wire electrically connected to the third TFT switch, and a fourth inspection wire electrically connected to the fourth TFT switch.

2. The display device according to claim 1, wherein the terminal wires are formed in the same layer.

3. The display device according to claim 1, wherein the terminal wires are formed of a gate metal.

4. The display device according to claim 1, wherein the terminal wires are formed of a SD metal.

5. The display device according to claim 1, wherein the wide portion of the first terminal and the wide portion of the third terminal are staggered with respect to each other, the narrow portion of the first terminal and the narrow portion of the third terminal are staggered with respect to each other, the wide portion of the second terminal and the wide portion of the fourth terminal are staggered with respect to each other, and the narrow portion of the second terminal and the narrow portion of the fourth terminal are staggered with respect each other.

6. The display device according to claim 5, wherein each of the first terminal wire, the second terminal wire, the third terminal wire, and the fourth terminal wire has a first portion and a second portion which is narrower than the first portion; and
   wherein the wide portion of the first terminal is connected to the first portion of the first terminal wire via a first contact hole, the narrow portion of the first terminal overlaps the second portion of the first terminal wire, the wide portion of the second terminal is connected to the first portion of the second terminal wire via a second contact hole, the narrow portion of the second terminal overlaps the second portion of the second terminal wire, the wide portion of the third terminal is connected to the first portion of the third terminal wire via a third contact hole, the narrow portion of the third terminal overlaps the second portion of the third terminal wire, the wide portion of the fourth terminal is connected to the first portion of the fourth terminal wire via a fourth contact hole, and the narrow portion of the fourth terminal overlaps the second portion of the fourth terminal wire.

7. The display device according to claim 1, wherein the transparent conductive film is formed of ITO.

8. The display device according to claim 1, wherein the third region has a first predetermined wire connected to the first inspection wire and the first terminal wire, a second predetermined wire connected to the second inspection wire and the second terminal wire, a third predetermined wire connected to the third inspection wire and the third terminal wire, and a fourth predetermined wire connected to the fourth inspection wire and the fourth terminal wire; and
   wherein the first, second, third and fourth inspection wires extend in a direction perpendicular to a direction in which the terminal wires run, and the first, second, third and fourth predetermined wires extend in the direction in which the terminal wires run.

* * * * *